United States Patent [19]

Barberis

[11] Patent Number: 4,564,245

[45] Date of Patent: Jan. 14, 1986

[54] PARKING BRAKE CONTROL APPARATUS

[75] Inventor: Dario Barberis, Turin, Italy

[73] Assignee: WABCO Westinghouse Compagnia Freni S.p.A., Turin, Italy

[21] Appl. No.: 623,794

[22] Filed: Jun. 22, 1984

[30] Foreign Application Priority Data

Jun. 22, 1983 [IT] Italy .............................. 67693 A/83

[51] Int. Cl.$^4$ .......................... B60T 7/00; B60T 13/70; B60T 15/14; B60T 13/22
[52] U.S. Cl. ......................................... 303/15; 303/71
[58] Field of Search .................................... 303/15–17, 303/13–14, 71, 3, 84 AH, 86, 6 M; 188/153 AH, 151 A, 105 AH, 106 AH, 107, 170, 167–169

[56] References Cited

U.S. PATENT DOCUMENTS

| | | | |
|---|---|---|---|
| 3,456,988 | 7/1969 | Gibbons et al. | 303/71 X |
| 3,507,542 | 4/1970 | Cannella | 303/15 X |
| 4,339,154 | 7/1982 | Duttarer et al. | 303/3 |
| 4,400,039 | 8/1983 | Ogata | 303/3 |

Primary Examiner—Douglas C. Butler
Attorney, Agent, or Firm—J. O. Ray, Jr.

[57] ABSTRACT

Parking brake control apparatus on a vehicle equipped with electrofluidic responsive brakes is disclosed. The apparatus comprises a parking brake on the vehicle operable by a cylinder. A source of pressurized fluid provides fluid pressure to the cylinder. The cylinder responds to fluid pressure to release the parking brake and responds to apply the parking brake when fluid pressure is vented. A directional valve connected intermediate the source of fluid pressure and the cylinder controls fluid communication to the cylinder in one position and vents fluid pressure from the cylinder in a second position. Movement to the second position is controlled on one side of the valve by an electrovalve which responds to electrical signals and on the other side by a cylinder which responds to fluid pressure and can only occur when both an electrical signal is below a predetermined minimum and the fluid pressure is reduced.

5 Claims, 1 Drawing Figure

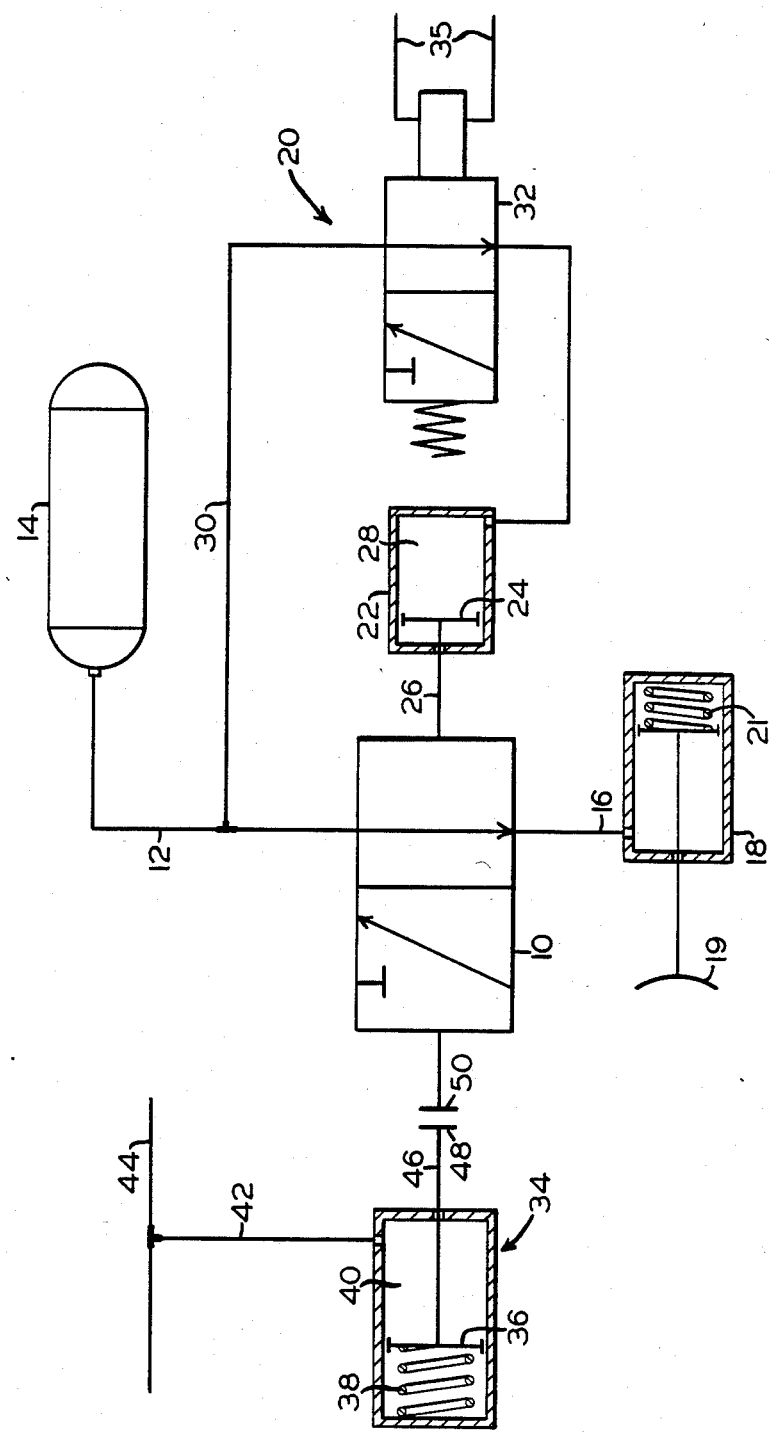

4,564,245

PARKING BRAKE CONTROL APPARATUS

BACKGROUND OF THE INVENTION

The present invention relates in a general way to vehicle parking brakes and, more particularly, the present invention is directed to an electrofluidic parking brake control apparatus operable on a vehicle that is equipped with an electrofluidic braking system.

A rather significant number of vehicles that are in present day use are equipped with such electrofluidic type braking systems. One type of electrofluidic braking system is disclosed in my earlier filed and copending U.S. patent application bearing Ser. No. 564,655, that was filed on Dec. 23, 1983 and allowed on Mar. 15, 1985 the subject matter of which is incorporated herein by reference. It is known that an electrofluidic braking system is of particular usefulness in the railroad industry and this is especially the case with respect to the rapid transit segment of such railroad industry because of the generally smoother and more uniform braking action observed with an electrofluidic braking system.

Nevertheless, despite the popularity of the electrofluidic braking systems, one problem of considerable concern has been observed with the parking brake of such systems. The problem observed is that there has been a number of occasions when an untimely application of the parking brake has occurred. This is an undesirable situation in that when an application of the parking brake occurs and such application was not initiated by the person operating the vehicle then a number of things may happen. Unfortunately, none of the things which can occur would be considered desirable. For example, one of the things that will be experienced is added wear and tear on the vehicle braking equipment especially to the brake shoes. This in turn not only adds to the maintenance cost of the braking equipment but in addition and of even more importance the equipment is out of service during such maintenance. Furthermore, added cost will be incurred as a result of the increased wear that will likely be experienced on the metallic wheels on railway equipment or rubber tires on over-the-road type vehicles as well as to the metal rails or various types of roadway surfaces for such respective vehicles. An additional cost can also be associated with this problem due to the extra power that is required to overcome the drag on the wheels caused by the parking brake which necessitates the use of added fuel.

It may also be observed especially with respect to a rapid transit system of the rail type that numerous schedule delays may be experienced not only to the vehicle that is undergoing such untimely parking brake application but also to other vehicles which may be following on the same track. Obviously, many passengers may be unhappy over such delays and as a consequence the rapid transit system may lose future passengers and the revenue from such passengers.

SUMMARY OF THE INVENTION

The present invention teaches an electrofluidic parking brake control apparatus on a vehicle equipped with an electrofluidic brake system. The electrofluidic brake system being responsive to an electrical signal and to a fluid pressure signal. The parking brake control apparatus of the invention comprises at least one parking brake mounted on such vehicle. A first source of pressurized fluid is provided and is connected to supply a first fluid pressure to operate the parking brake on such vehicle. Also provided is a pressurized fluid operated first cylinder which is connected intermediate the first source of pressurized fluid and the parking brake. The first cylinder being responsive to the first fluid pressure to release the parking brake and being responsive to apply the parking brake when the first fluid pressure is vented from the first cylinder. A two-position directional valve is provided and is connected intermediate the first source of pressurized fluid and the first cylinder. The directional valve being operable in a first position to establish a first fluid communication between the first source of pressurized fluid and the first cylinder thereby releasing the parking brake. The directional valve being operable in a second position to close the first fluid communication and vent the first fluid pressure from the first cylinder thereby applying the parking brake. A second source of pressurized fluid which is connected to supply a second fluid pressure to maintain the directional valve in the first position is also provided. A pressurized fluid operated second cylinder is mechanically connected to the directional valve and to the second source of pressurized fluid. The second cylinder is responsive to the second fluid pressure to maintain the directional valve in the first position and is responsive to allow shifting of the directional valve to the second position when the second fluid pressure is vented from the second cylinder. A two-position directional electrovalve means that is responsive to an electrical control signal is connected intermediate the second cylinder and the second source of pressurized fluid. The electrovalve is operable in a first position to establish a second fluid communication between the second source of pressurized fluid and the second cylinder when the electrical control signal is at least a predetermined minimum value. The electrovalve is operable in a second position to close the second fluid communication between the second source of pressurized fluid and the second cylinder and to vent the second fluid pressure from the second cylinder thereby allowing the directional valve to shift to the second position when the electrical control signal is below the predetermined minimum value. A third source of pressurized fluid supplies a third fluid pressure to a third cylinder. The third cylinder is responsive to the third fluid pressure to allow the directional valve to remain in the first position. The third cylinder is also responsive to shift the directional valve to the second position when both the third fluid pressure is vented from the third cylinder and the electrical control signal is below the predetermined minimum.

OBJECTS OF THE INVENTION

It is therefore the primary object of the present invention to provide a parking brake control apparatus that will minimize the number of instances where an undesirable and/or untimely application of the parking brake will occur.

Another object of the present invention is to provide a parking brake control apparatus which requires both a fluid pressure drop to occur and an electrical control signal below a predetermined minimum value to also occur during the same time interval before an application of the parking brake is possible.

These and various other objects and advantages of the present invention will become more apparent to those persons skilled in the braking art from the following detailed description when such description is taken in conjunction with the attached drawing.

BRIEF DESCRIPTION OF THE DRAWING

The single FIGURE is a schematic illustration of the parking brake control apparatus of the present invention.

BRIEF DESCRIPTION OF THE INVENTION

Although the invention is not limited thereto, it will be described as it relates to an installation on a rail-type vehicle for illustration of the principals of such invention.

As illustrated in the drawing, the presently preferred embodiment of the parking brake control apparatus comprises a directional valve 10 that has two positions and is a two-way valve. The inlet of the directional valve 10 is connected via line 12 for fluid communication with a first source of pressurized fluid. According to the presently preferred practice of the invention, the first fluid pressure is supplied from an auxiliary reservoir 14 installed on a rail-type vehicle (not shown). In the case under consideration, the preferred fluid is compressed air and therefore auxiliary reservoir 14 is a compressed air tank.

The outlet of the directional valve 10 is connected via fluid communication line 16 to a first pneumatic cylinder 18 connected to apply and release the parking brake 19 of the vehicle. Cylinder 18 responds to fluid pressure to release parking brake 19 and spring 21 applies parking brake 19 when such fluid pressure is vented from cylinder 18.

Directional valve 10 can be shifted between a closed position and an open position as will be described hereinafter. As it is shown in the drawing, the directional valve 10 is in the open position in which it opens the fluid communication between auxiliary air tank 14 and first cylinder 18 when the parking brake 19 is in the release or off position and the directional valve 10 is in a closed position when this connection is discontinued and first cylinder 18 is in the discharging or venting position, thus obtaining the operation of the application of the parking brake 19.

During normal operating conditions, directional valve 10 is maintained in the open position by the action of the electropneumatic control device, generally designated as 20, which includes a second pneumatic cylinder 22 whose piston 24 is actively connected to directional valve 10 through a shaft or piston rod 26 and whose pressure chamber 28 is supplied by auxiliary tank 14 through a fluid communication line 30 branching from fluid communication line 12 through a directional two-position, two-way electrovalve 32 connected by supply lines 35 to an electrical power supply (not shown in the drawing). Although the second fluid pressure is shown being supplied to the second cylinder 22 from auxiliary tank 14, it is possible that such fluid pressure could be supplied from an alternate source.

In the activated position, electrovalve 32 is normally in the open position as it is shown in the drawing in order to maintain open the connection between fluid communication line 30 and the pressure chamber 28 of the second pneumatic cylinder 22 and to keep directional valve 10 in the open and parking brake release position on the vehicle.

When deactivated or when the electrical control signal from supply line 35 falls below a predetermined minimum value, the electrovalve 32 moves to the closing position. In this position, discharging or venting of the second fluid pressure from the pressure chamber 28 of the pneumatic cylinder 22 can occur and will allow triggering of the shifting to a closed position of directional valve 10.

Such shifting is controlled by a third pneumatic cylinder 34 placed in respect to the directional valve 10 on the opposite side of cylinder 22. An air-tight piston 36 moves inside cylinder 34 and on one side is under the action of an elicoidal spring 38 which pushes it in the direction of directional valve 10, and on the other side it forms the end of a pressure chamber 40 which is connected by fluid communication line 42 to a main fluid supply line 44 of the electropneumatic braking system of the rail-type vehicle.

Joined to piston 36 is an axial shaft 46 with a push-plate 48 which is positioned to abut push-plate 50 attached to directional valve 10. With pressure in chamber 40, piston 36 is placed in the retracted position as shown in the figure, against the action of spring 38. For this reason, plate 48 does not interfere with plate 50. When there is a pressure drop in the chamber 40, then spring 38 causes the shifting of piston 36 toward the right in the drawing, causing plate 48 to be pushed against plate 50 to move directional valve 10 from the open position to the closed position.

During the operation, in the case of normal electric power supply to the electrovalve 32 and of normal pressure on the inside of the main line 44 directional valve 10 stays in the open position shown in the drawing, causing cylinder 18 to be supplied by auxiliary tank 14 and the parking brake 19 is kept in the deactivated or release position.

To control the function of the parking brake 19, the two actions of interruption of electric power supply to electrovalve 32 and the drop of pressure inside main line 44 must happen at the same time. In fact, when electrovalve 32 is unexcited, it causes, as explained above, the discharge or venting of second pneumatic cylinder 22 and therefore the consent of directional valve 10 to close, while the pressure drop inside main line 44 causes the shifting of piston 36 under the action of spring 38 and therefore the closing of directional valve 10. This situation causes the discharge or venting of the first cylinder 18 and the subsequent activation of the parking brake 19.

To discharge or release the parking brake 19, it is necessary to restore the pressure inside line 44 in order to cause piston 36 of the third pneumatic cylinder 34 to retract and to reactivate the electric power supply 35 to valve 32 to a predetermined minimum value control signal in order to shift directional valve 10 in the open position after cylinder 22 is recharged by auxiliary tank 14.

Although the presently preferred embodiment of the invention has been shown and described in detail, other modifications may be made by those persons skilled in the art without departing from the spirit and scope of the attached claims.

Having now described the invention, what I claim as new and desire to secure by Letters Patent, is:

1. An electrofluidic parking brake control apparatus on a vehicle equipped with an electrofluidic brake system, such electrofluidic brake system being responsive to an electrical signal and to a fluid pressure signal, said parking brake control apparatus comprising:
    (a) at least one parking brake mounted on such vehicle;

(b) a first source of pressurized fluid connected to supply a first fluid pressure to operate said parking brake on such vehicle;

(c) a pressurized fluid operated first cylinder connected intermediate said first source and said parking brake, said first cylinder being responsive to said first fluid pressure to release said parking brake and being responsive to apply said parking brake when said first fluid pressure is vented from said first cylinder;

(d) a two-position directional valve connected intermediate said first source and said first cylinder, said directional valve being operable in a first position to establish a first fluid communication between said first source and said first cylinder thereby releasing said parking brake and said directional valve being operable in a second position to close said first fluid communication and venting said first fluid pressure from said first cylinder thereby applying said parking brake;

(e) a second source of pressurized fluid connected to supply a second fluid pressure to maintain said directional valve in said first position;

(f) a pressurized fluid operated second cylinder mechanically connected to said directional valve and to said second source, said second cylinder being responsive to said second fluid pressure to maintain said directional valve in said first position and being responsive to allow shifting of said directional valve to said second position when said second fluid pressure is vented from said second cylinder;

(g) a two-position directional electrovalve means responding to an electrical control signal and connected intermediate said second source and said second cylinder, said electrovalve being operable in a first position to establish a second fluid communication between said second source and said second cylinder when said signal is at least a predetermined minimum value and said electrovalve being operable in a second position to close said second fluid communication between said second source and said second cylinder and venting said second fluid pressure from said second cylinder thereby allowing said directional valve to shift to said second position when said electrical signal is below said predetermined minimum value;

(h) a third source of pressurized fluid connected to supply a third fluid pressure to shift said directional valve to said second position; and (i) a pressurized fluid operated third cylinder connected intermediate said third source and said directional valve, said third cylinder being responsive to said third fluid pressure to allow said directional valve to remain in said first position and being responsive to urge said directional valve to said second position when both said third fluid pressure is vented from said third cylinder thereby shifting said directional valve to said second position and said electrical signal is below said predetermined minimum.

2. A parking brake control apparatus, according to claim 1, wherein said electrofluidic parking brake control apparatus is electropneumatic, said first and said second sources of pressurized fluid are from at least one auxiliary reservoir and said third source of pressurized fluid is from a main fluid supply source on such vehicle.

3. A parking brake control apparatus, according to claim 2, wherein said first and second sources are from a common auxiliary reservoir.

4. A parking brake control apparatus, according to claim 1, wherein said second cylinder and said third cylinder are in substantial axial alignment with respect to each other on opposite sides of said directional valve.

5. A parking brake control apparatus, according to claim 1, wherein said first cylinder includes a spring and said parking brake is applied by said spring.

* * * * *